US012119032B1

(12) United States Patent
Matsumoto et al.

(10) Patent No.: US 12,119,032 B1
(45) Date of Patent: Oct. 15, 2024

(54) NEAR-FIELD TRANSDUCER FOR HEAT ASSISTED MAGNETIC RECORDING COMPRISING OF THERMALLY STABLE MATERIAL LAYER

(71) Applicant: Western Digital Technologies, Inc., San Jose, CA (US)

(72) Inventors: Takuya Matsumoto, San Jose, CA (US); Hamid Balamane, Portola Valley, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,779

(22) Filed: Aug. 3, 2023

Related U.S. Application Data

(60) Provisional application No. 63/523,573, filed on Jun. 27, 2023.

(51) Int. Cl.
  *G11B 5/00* (2006.01)
  *G11B 5/40* (2006.01)
  *G11B 13/08* (2006.01)
(52) U.S. Cl.
  CPC ............... *G11B 5/40* (2013.01); *G11B 13/08* (2013.01); *G11B 2005/0021* (2013.01); *G11B 2209/02* (2013.01)
(58) Field of Classification Search
  CPC . G11B 13/08; G11B 2005/0021; G11B 5/102; G11B 5/3116; G11B 5/1875; G11B 5/6088; G11B 5/3133; G11B 5/3912; G11B 5/4866

USPC .......................................................... 360/59
See application file for complete search history.

(56) References Cited

U.S. PATENT DOCUMENTS

| 10,490,215 | B1 | 11/2019 | Chen |
| 10,636,442 | B2 * | 4/2020 | Matsumoto .......... G11B 5/6088 |
| 11,710,506 | B1 | 7/2023 | Peng et al. |
| 2013/0286799 | A1 | 10/2013 | Zhu et al. |
| 2017/0047088 | A1 | 2/2017 | Matsumoto et al. |
| 2019/0378539 | A1 | 12/2019 | Matsumoto et al. |
| 2023/0059099 | A1 | 2/2023 | Yu et al. |

OTHER PUBLICATIONS

International Search Report and Written Opinion for Application No. PCT/US2024/012457 dated May 8, 2024.

* cited by examiner

*Primary Examiner* — Nabil Z Hindi
(74) *Attorney, Agent, or Firm* — PATTERSON + SHERIDAN, LLP

(57) ABSTRACT

The present disclosure generally relates to a magnetic recording head for a magnetic media drive. The magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT at the MFS. In some embodiments, the stable material is wedge-shaped or triangular-shaped. In another embodiment, the stable material comprises a first portion and a second portion, where the first and second portions may each by linear, or where the first portion is triangular-shaped and the second portion is square-shaped. The stable material may be in contact with the thermal shunt, or spaced from the thermal shunt.

23 Claims, 8 Drawing Sheets

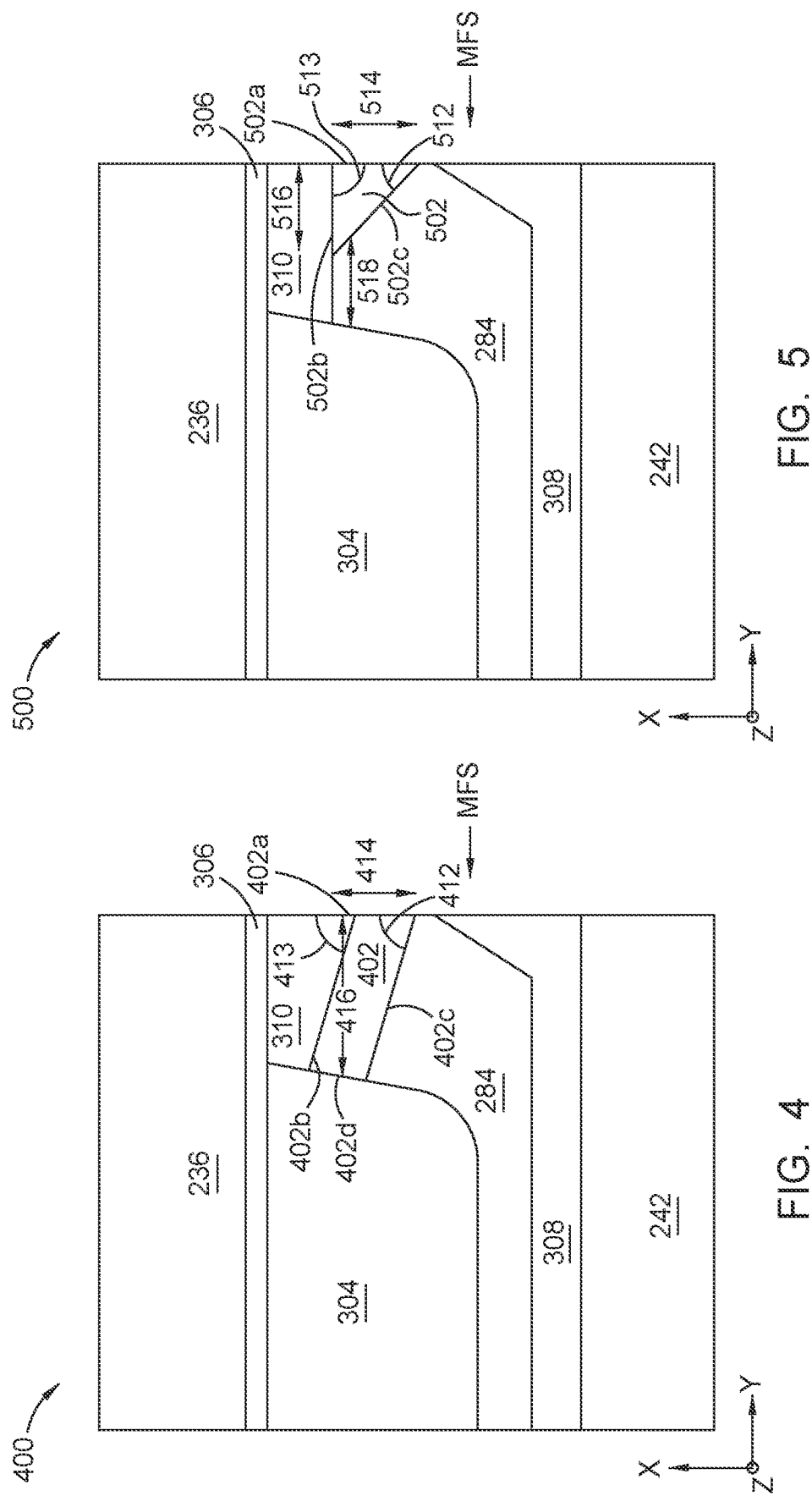

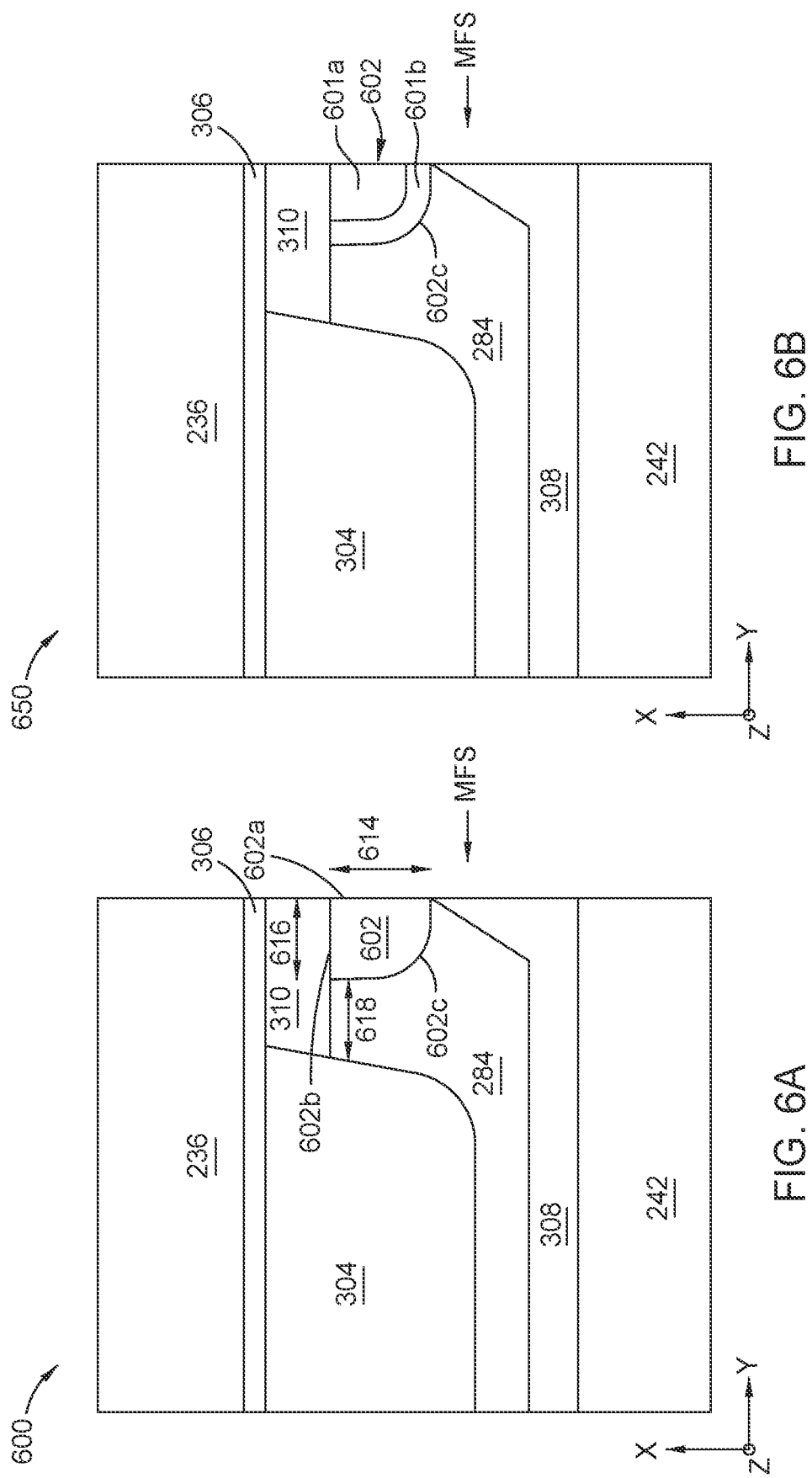

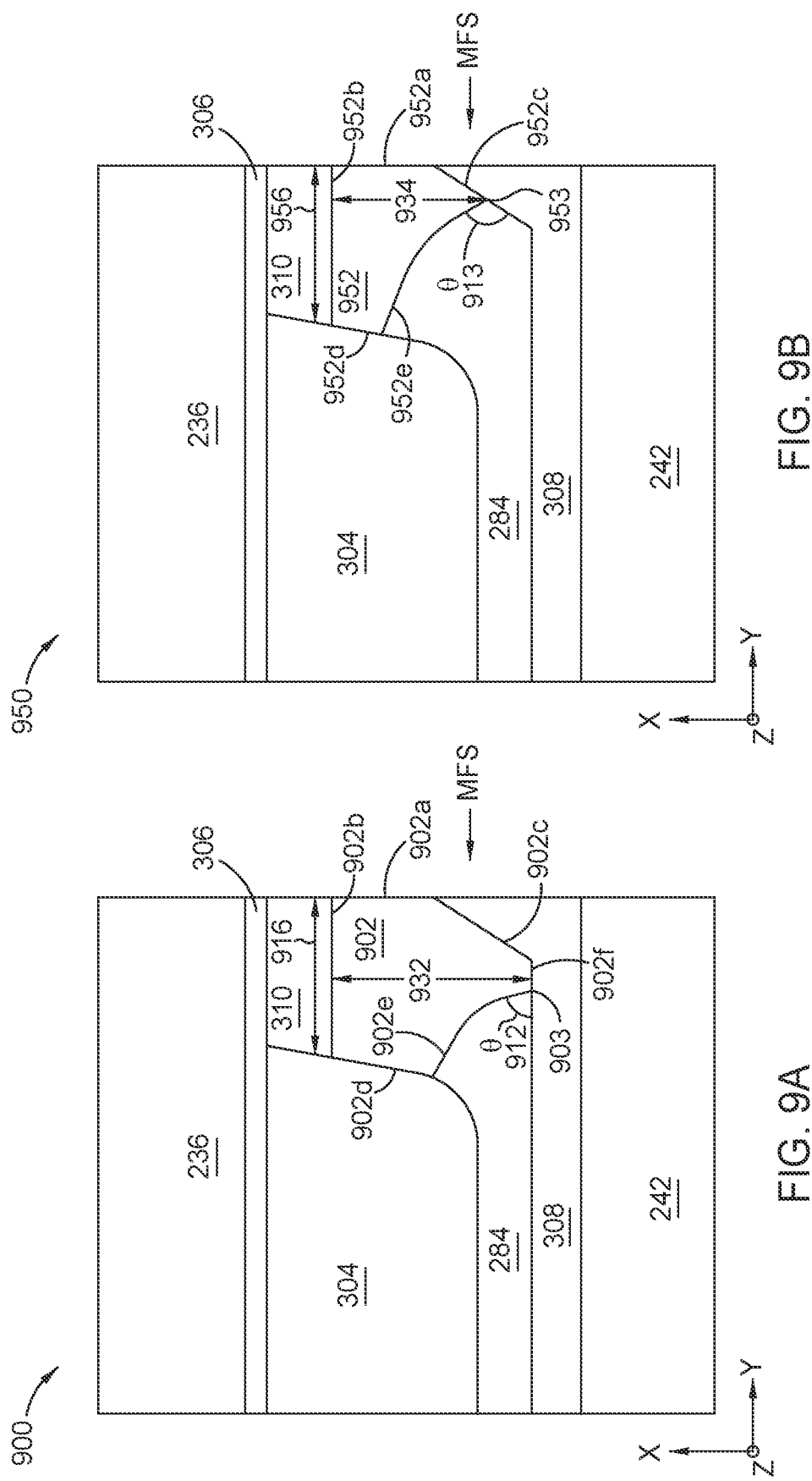

NEAR-FIELD TRANSDUCER FOR HEAT ASSISTED MAGNETIC RECORDING COMPRISING OF THERMALLY STABLE MATERIAL LAYER

CROSS-REFERENCE TO RELATED APPLICATIONS

This application claims benefit of U.S. provisional patent application Ser. No. 63/523,573, filed Jun. 27, 2023, which is herein incorporated by reference.

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature may reach more than 150 degrees Celsius over the operational temperature of the magnetic disk device, causing the NFT to deform.

Therefore, there is a need in the art for an improved HAMR magnetic media drive.

SUMMARY OF THE DISCLOSURE

The present disclosure generally relates to a magnetic recording head for a magnetic media drive. The magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT at the MFS. In some embodiments, the stable material is wedge-shaped or triangular-shaped. In another embodiment, the stable material comprises a first portion and a second portion, where the first and second portions may each by linear, or where the first portion is triangular-shaped and the second portion is square-shaped. The stable material may be in contact with the thermal shunt, or spaced from the thermal shunt.

In one embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT between the thermal shunt and the MFS, the stable material having a wedge shape comprising: a first surface disposed at the MFS, a second surface extending from the MFS to the thermal shunt, and one of: a third surface disposed adjacent to the NFT connecting the first surface to the second surface, or a third surface and a fourth surface, wherein is the third surface is disposed adjacent to the NFT and the fourth surface disposed adjacent to the thermal shunt and connects the third surface to the second surface, and wherein a length of the first surface disposed at the MFS is greater than a length of the fourth surface disposed adjacent to the thermal shunt to create the wedge shape.

In another embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT between the thermal shunt and the MFS, the stable material comprising a first portion and a second portion, wherein the first portion extends from the MFS to the second portion at an angle of about 3 degrees to about 87 degrees with respect to the MFS, and wherein the second portion extends from the first portion to the thermal shunt.

In another embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT at the MFS, the stable material being spaced from the thermal shunt, wherein the stable material comprises a first surface disposed at the MFS, a second surface disposed substantially perpendicular to the MFS, and a third surface connecting the first surface and the second surface, the third surface being curved.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a cross-sectional view of a portion of HAMR write head, according to another embodiment.

FIG. 5 illustrates a cross-sectional view of a portion of HAMR write head, according to yet another embodiment.

FIG. 6A illustrates a cross-sectional view of a portion of HAMR write head, according to one embodiment.

FIG. 6B illustrate a cross-sectional view of a portion of HAMR write head comprising multiple stable material layers, according to yet another embodiment.

FIGS. 9A-9B illustrate cross-sectional views of a portion of HAMR write heads having a NFT with a convex shape profile, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head for a magnetic media drive. The magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT at the MFS. In some embodiments, the stable material is wedge-shaped or triangular-shaped. In another embodiment, the stable material comprises a first portion and a second portion, where the first and second portions may each by linear, or where the first portion is triangular-shaped and the second portion is square-shaped. The stable material may be in contact with the thermal shunt, or spaced from the thermal shunt.

Figure 1:
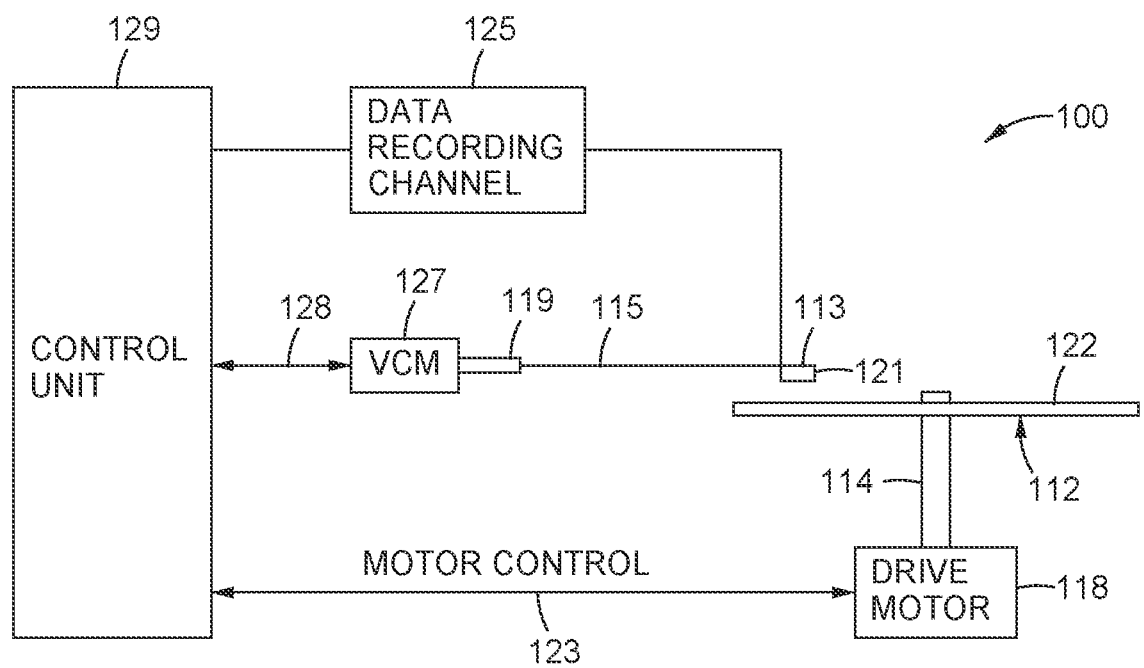
FIG. 1 is a schematic illustration of certain embodiments of a magnetic media drive including a HAMR magnetic write head.

FIG. 1 is a schematic illustration of certain embodiments of a magnetic media drive 100 including an energy-assisted magnetic recording (EAMR) write head, such as a heat-assisted magnetic recording (HAMR) or microwave assisted magnetic recording (MAMR) write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
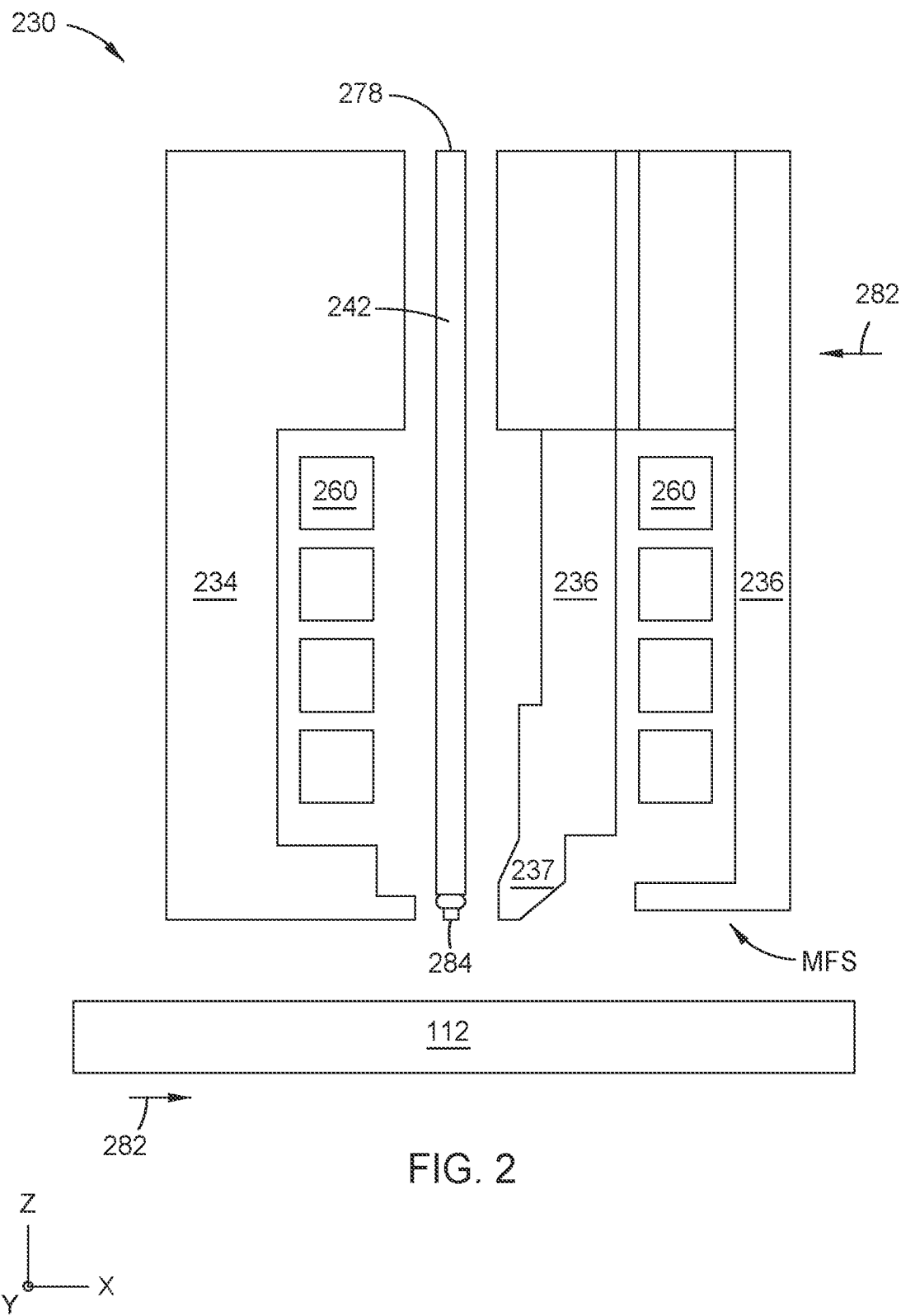
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The waveguide 242, may be a spot size converter (SSC) that includes numerous waveguides and a multimodal interference (MMI) device. The present disclosure generally relates to the management and enhancement of the profile of the SSC. The SSC discussed herein results in significant improvement in the overall coupling efficiency between a coherent light source and the waveguide inside a photonic integrated circuit (PIC) or planar waveguide circuit (PLC) of a HAMR head slider. The geometry and position of the core materials/assist core channels both on the lateral and vertical vicinity of a center waveguide core are discussed herein. The overall field profile of the SSC can be tuned to match the field profile or the mode of a coherent light source, leading to significant enhancement in the overall coupling efficiency.

Optical power from an external coherent light source (i.e., EELD, surface emitting diode laser, VCSEL device, or fiber coupled diode laser) is coupled into the PLC of the HAMR head slider through the SSC or mode converter. The basic design concept is to match the mode profile of the incoming light source and the mode profile of the PLC, both at the coupling interface, hence maximizing the overall coupling efficiency.

FIGS. 3A-10C illustrate various cross-sectional views of a portion of HAMR write heads 300, 350, 400, 500, 600, 650, 700, 800, 900, 950, 1000, respectively, according to embodiments herein. Each of the HAMR write heads 300, 350, 400, 500, 600, 650, 700, 800, 900, 950, 1000 may individually be the HAMR write head 230 of FIG. 2, and each of the HAMR write heads 300, 350, 400, 500, 600, 650, 700, 800, 900, 950, 1000 may individually be, or be a part of, the magnetic media drive 100 of FIG. 1. Aspects of the HAMR write heads 300, 350, 400, 500, 600, 650, 700, 800, 900, 950, 1000 may be used in combination with one another.

Each HAMR write head 300, 350, 400, 500, 600, 650, 700, 800, 900, 950, 1000 comprises the main pole 236, the waveguide 242, and the NFT 284 disposed therebetween. In each HAMR write head 300, 350, 400, 500, 600, 650, 700, 800, 900, 950, 1000, a thermal shunt 304 is disposed on the NFT 284 recessed from the MFS. A diffusion barrier 306 is disposed between and in contact with the main pole 236 and the thermal shunt 304. The diffusion barrier 306 extends to the MFS. A first insulating layer 308 is disposed between the NFT 284 and the waveguide 242. A second insulating layer 310 is disposed adjacent to the diffusion barrier 306 and to the thermal shunt 304.

The first and second insulating layers 308, 310 may each individually comprise a transparent dielectric material, such as $SiO_2$, $Al_2O_3$, Silicon Oxynitride (SiOxNy; where x and y are numerals greater than 1), Aluminum Silicon Oxide ($Al_2O_3$—$SiO_2$), $MgF_2$, MgO, $TiO_2$, $Ta_2O_5$, $Y_2O_3$, SiN, SiC, AlN, or Ge doped $SiO_2$, for example. The NFT 284 may comprise a material with low optical loss, such as Au, Ag, Cu, Al, Rh, Ir, Ru, Cr, Pt, Ti, Fe, Co, Ni, Pd, Cd, Zn, combinations thereof, or alloys thereof. The thermal shunt 304 may comprise a material with high thermal conductivity, such as Au, Ag, Cu, Al, Rh, Ir, Ru, Cr, Pt, Ti, Fe, Co, Ni, Pd, Cd, Zn, combinations thereof, or alloys thereof. The diffusion barrier 306 may comprise Ru, Rh, Ti, W, Mo, or Pt.

Figure 3B:
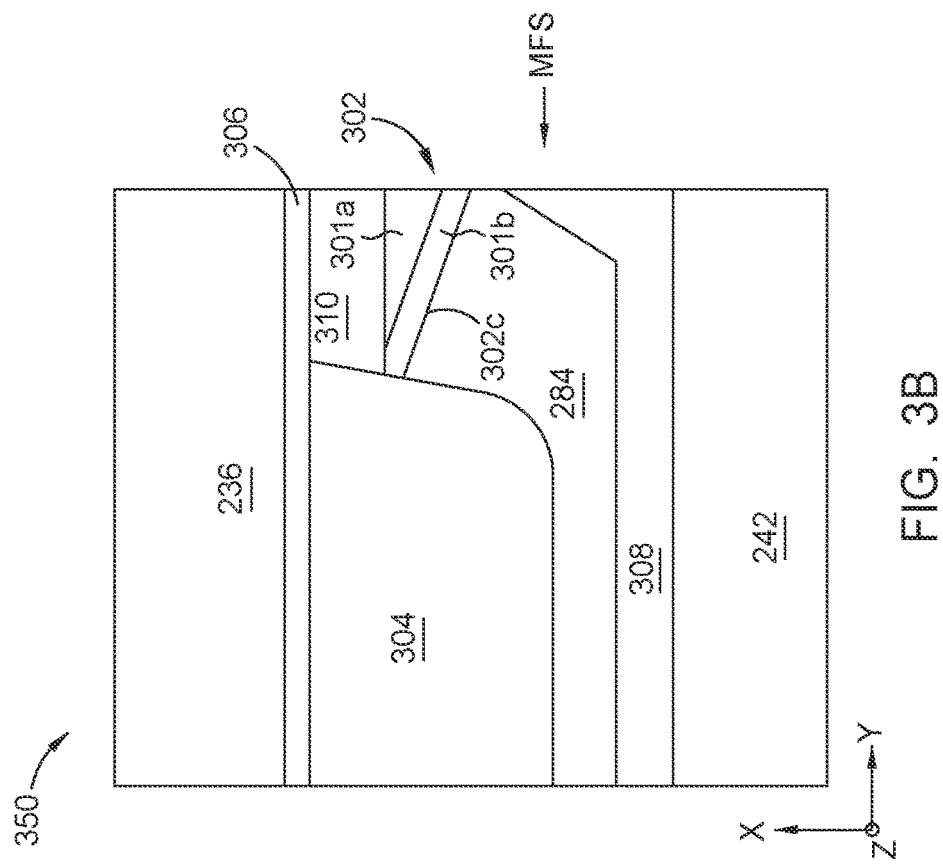
FIG. 3B illustrate a cross-sectional view of a portion of HAMR write head comprising multiple stable material layers, according to another embodiment.
Figure 3A:
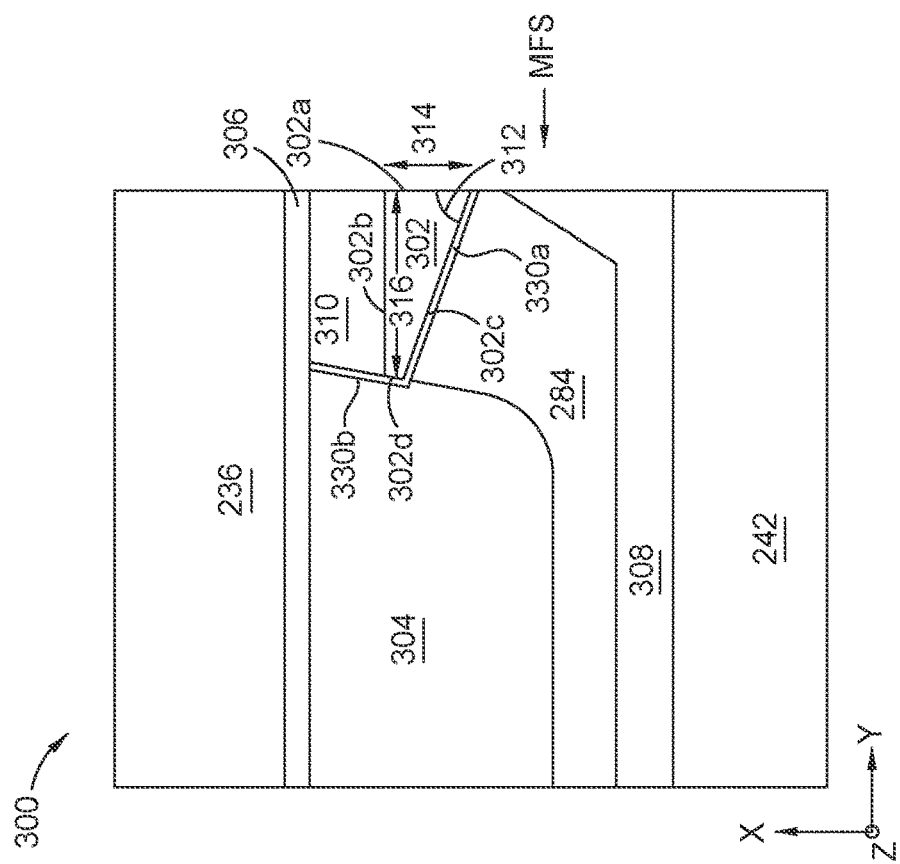
FIG. 3A illustrates a cross-sectional view of a portion of HAMR write head, according to one embodiment.

In the HAMR write head 300 of FIG. 3A, a stable material 302 is disposed between the NFT 284, the second insulating layer 310, and the thermal shunt 304 at the MFS. The stable material 302 contacts a portion of each of the thermal shunt 304, and the second insulating layer 310. The HAMR write head 300 further comprises a first optional diffusion barrier layer 330a disposed between the stable material 302 and the NFT 284, and a second optional diffusion barrier layer 330b disposed between the stable material 302 and the thermal shunt 304 and between the second insulating layer 310 and the thermal shunt 304. The stable material 302 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 302 is wedge-shaped or triangular-shaped, having a first surface 302a at the MFS, a second surface 302b disposed in contact with the second insulating layer 310, a third surface 302c disposed in contact with the NFT 284, and a fourth surface 302d disposed in contact with the thermal shunt 304. In some embodiments, the fourth surface 302d may be a point where the second and third surfaces 302b, 302c connect. The optional diffusion barrier layers 330a, 330b each has a thickness in the xy-direction of about 0.5 nm to about 5 nm, and comprises one or more of Ru, Rh, Ti, W, Mo, and/or Pt. The optional diffusion barrier layers 330a, 330b may be included to avoid material diffusion between various layers.

The first surface 302a is substantially planar with the MFS, and has a length 314 in the x-direction of about 5 nm to about 60 nm, such as about 20 nm. The second surface 302b is substantially planar and perpendicular to the first surface 302a, and has a length 316 in the y-direction of about 30 nm to about 100 nm, such as about 50 nm. The first surface 302a and the second surface 302b may form an angle of about 90 degrees. The third surface 302c is disposed at an angle 312 of about 20 degrees to about 87 degrees, such as about 70 degrees, with respect to the MFS.

The HAMR write head 350 of FIG. 3B is similar to the HAMR write head 300 of FIG. 3A; however, the stable material 302 is a structure comprising a first stable material layer 301a and a second stable material layer 301b. The first stable material layer 301a is disposed in contact with the second insulating layer 310, and the second stable material layer 301b is disposed in contact with the NFT 284 and the first stable material layer 301a. The first stable material layer 301a and the second stable material layer 301b comprise different materials. The first stable material layer 301a and the second stable material layer 301b each individually comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The first stable material layer 301a has a thickness in the x-direction of about 5 nm to about 30 nm, such as a bout 10 nm, and the second stable material layer 301b has a thickness in the x-direction of about 5 nm to about 50 nm, such as about 10 nm. While two stable material layers 301a, 301b are shown, the stable material structure 302 may comprise two or more stable material layers.

The HAMR write head 400 of FIG. 4 is similar to the HAMR write head 300 of FIG. 3A, where a stable material 402 is disposed between and in contact with the NFT 284, the second insulating layer 310, and the thermal shunt 304 at the MFS. The stable material 402 contacts a portion of each of the NFT 284, the thermal shunt 304, and the second insulating layer 310. The stable material 402 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 402 is wedge-shaped or triangular-shaped, having a first surface 402a at the MFS, a second surface 402b disposed in contact with the second insulating layer 310, a third surface 402c disposed in contact with the NFT 284, and a fourth surface 402d disposed in contact with the thermal shunt 304. While not shown, the HAMR write head 400 may comprise one or more of the optional diffusion barrier layers 330a, 330b, and/or the stable material 402 may be a multilayer structure, like shown in FIGS. 3B and 6B.

The first surface 402a is substantially planar with the MFS, and has a length 414 in the x-direction of about 5 nm to about 60 nm, such as about 20 nm. The second surface 402b is disposed at an angle 413 of about 45 degrees to about 87 degrees, such as about 80 degrees, with respect to the MFS, and has a length 316 in the y-direction of about 30 nm to about 100 nm, such as about 50 nm. The third surface 402c is disposed at an angle 412 of about 20 degrees to about 87 degrees, such as about 70 degrees, with respect to the MFS. The fourth surface 402d has a length in the x-direction less than the lengths of each of the first, second, and third surfaces 402a-402c.

The HAMR write head 500 of FIG. 5 is similar to the HAMR write head 300 of FIG. 3A and the HAMR write head 400 of FIG. 4, where a stable material 502 is disposed between the NFT 284 and the second insulating layer 310 at the MFS. However, the stable material 502 is spaced a distance 518 of about 10 nm to about 90 nm from the thermal shunt 304, and thus, does not contact the thermal shunt 304. The stable material 502 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 502 is triangular-shaped, having a first surface 502a at the MFS, a second surface 502b disposed in contact with the second insulating layer 310, and a third surface 502c disposed in contact with the NFT 284. While not shown, the HAMR write head 500 may comprise one or more of the optional diffusion barrier layers 330a, 330b, and/or the stable material 402 may be a multilayer structure, like shown in FIGS. 3B and 6B.

The first surface 502a is substantially planar with the MFS, and has a length 514 in the x-direction of about 5 nm to about 60 nm, such as about 20 nm. The second surface 502b is substantially planar and perpendicular to the first surface 502a and has a length 516 in the y-direction of about 10 nm to about 90 nm, such as about 50 nm. The length 514 of the first surface 502a may be substantially equal to the length 516 of the second surface 652b. The first surface 502a and the second surface 502b may form an angle 513 of about 80 degrees to about 135 degrees, such as about 105 degrees, with respect to the MFS. The third surface 502c is disposed at an angle 512 of about 30 degrees to about 60 degrees, such as about 45 degrees, with respect to the MFS.

The HAMR write head 600 of FIG. 6A is similar to the HAMR write head 500 of FIG. 5, where a stable material 602 is disposed between the NFT 284 and the second insulating layer 310 at the MFS. Like the stable material 502, the stable material 602 is spaced a distance 618 of about 10 nm to about 90 nm, such as about 30 nm, from the thermal shunt 304, and thus, does not contact the thermal shunt 304. The stable material 602 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 602 has a first surface 602a at the MFS, a second surface 602b disposed in contact with the second insulating layer 310, and a third surface 602c disposed in contact with the NFT 284. While not shown, the HAMR write head 600 may comprise one or more of the optional diffusion barrier layers 330a, 330b.

The first surface 602a is substantially planar with the MFS, and has a length 614 in the x-direction of about 10 nm to about 60 nm, such as about 30 nm. The second surface 602b is substantially planar and perpendicular to the first surface 602a and has a length 616 in the y-direction of about 10 nm to about 90 nm, such as about 30 nm. The first surface 602a and the second surface 602b may form an angle of about 80 degrees to about 135 degrees, such as about 105 degrees. The third surface 602c is rounded or curved, and connects the first surface 602a to the second surface 602b. The third surface 602c is a convex curve.

The HAMR write head 650 of FIG. 6B is similar to the HAMR write head 600 of FIG. 6A; however, the stable material 602 is a structure comprising a first stable material layer 601a and a second stable material layer 601b. The first stable material layer 601a is disposed in contact with the second insulating layer 310, and the second stable material layer 601b is disposed in contact with the NFT 284 and the first stable material layer 601a. The first stable material layer 601a and the second stable material layer 601b comprise different materials. The first stable material layer 601a and the second stable material layer 601b each individually comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TIN, HfN, and NbN. The first stable material layer 601a has a thickness in the x-direction of about 5 nm to about 30 nm, such as about 10 nm, and the second stable material layer 601b has a thickness in the x-direction of about 5 nm to about 50 nm, such as about 10 nm. While two stable material layers 601a, 601b are shown, the stable material structure 302 may comprise two or more stable material layers.

Figure 7:
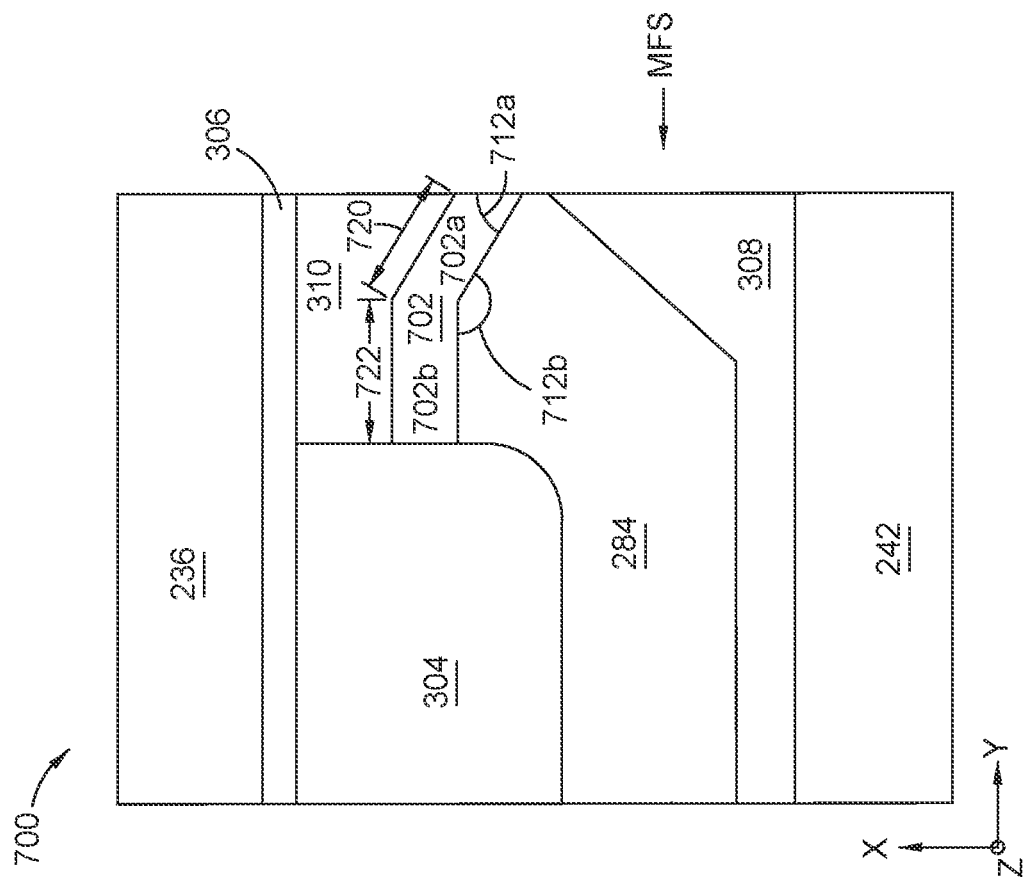
FIG. 7 illustrates a cross-sectional view of a portion of HAMR write head, according to another embodiment.

The HAMR write head 700 of FIG. 7 is similar to the HAMR write head 300 of FIG. 3A and the HAMR write head 400 of FIG. 4, where a stable material 702 is disposed between and in contact with the NFT 284, the second insulating layer 310, and the thermal shunt 304 at the MFS. The stable material 702 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TIN, HfN, and NbN. The stable material 702 comprises a first portion 702a disposed at the MFS and a second portion 702b recessed from the MFS adjacent to the thermal shunt 304. The first and second portions 702a, 702b are substantially linear. The first portion 702a is disposed at a first angle 712a of about 40 degrees to about 87 degrees, such as about 75 degrees, with respect to the MFS, and a second angle 712b of about 130 degrees to about 175 degrees, such as about 165 degrees with respect to the second portion 702b. The second portion 702b is disposed substantially perpendicular to the MFS.

In some embodiments, the first portion 702a and the second portion 702b have a same thickness in the x-direction. In other embodiments, the first portion 702a and the second portion 702b have different thicknesses in the x-direction. The first portion 702a has a length 720 in the xy-direction of about 5 nm to about 90 nm, such as about 25 nm, from the MFS to the second portion 702b, and the second portion 702b has a length 722 in the y-direction of about 5 nm to about 90 nm, such as about 25 nm, from the first portion 702a to the thermal shunt 304. While not shown, the HAMR write head 700 may comprise one or more of the optional diffusion barrier layers 330a, 330b, and/or the stable material 702 may be a multilayer structure, like shown in FIGS. 3B and 6B.

Figure 8:
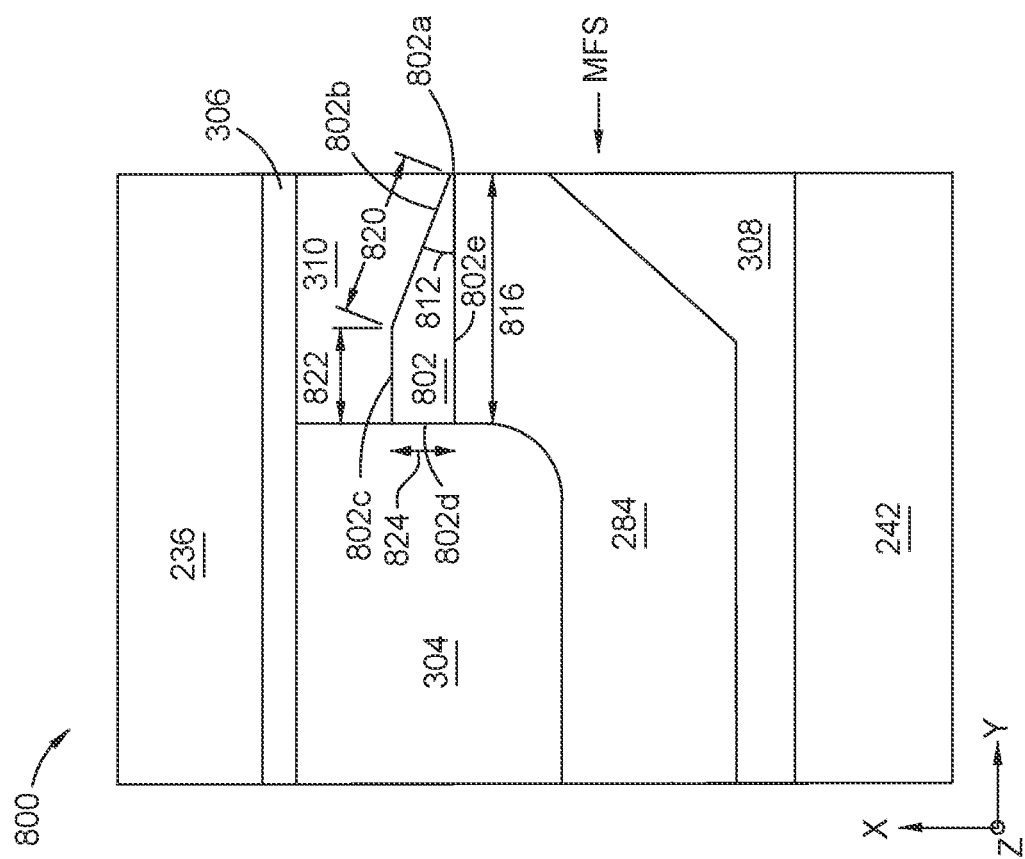
FIG. 8 illustrates a cross-sectional view of a portion of HAMR write head, according to yet another embodiment.

The HAMR write head 800 of FIG. 8 is similar to the HAMR write head 300 of FIG. 3A, the HAMR write head 400 of FIG. 4, and the HAMR write head 700 of FIG. 7, where a stable material 802 is disposed between and in contact with the NFT 284, the second insulating layer 310, and the thermal shunt 304 at the MFS. The stable material 802 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TIN, HfN, and NbN. The stable material 802 has a trapezoid-like shape, having a first surface 802a disposed at the MFS, a second surface 802b disposed in contact with the second insulating layer 310, a third surface 802c disposed between the second surface 802b and the thermal shunt 304, a fourth surface 802d disposed in contact with the thermal shunt 304, and a fifth surface 802e disposed in contact with the NFT 284. In some embodiments, the first surface 802a is a point where the second surface 802b and the fifth surface 802e connect. As such, the thicker part of the trapezoidal-shaped stable material 802 is disposed adjacent to the thermal shunt 304.

In some embodiments, the stable material 802 may be considered to comprise a first portion that is triangular in shape (i.e., adjacent to the MFS) and a second portion that is square or rectangular in shape (i.e., adjacent to the thermal shunt 304), collectively forming the overall trapezoidal shape of the stable material 802. While not shown, the HAMR write head 800 may comprise one or more of the optional diffusion barrier layers 330a, 330b, and/or the stable material 802 may be a multilayer structure, like shown in FIGS. 3B and 6B.

The second surface 802b has a length 820 in the xy-direction of about 5 nm to about 90 nm, such as about 25 nm, from the MFS to the third surface 802c. The third surface 802c has a length 822 in the y-direction of about 5 nm to about 90 nm, such as about 25 nm, from the second surface 802b to the thermal shunt 304. The fourth surface 802d has a length 824 in the x-direction of about 5 nm to about 50 nm. The fifth surface 802e has a length 816 in the y-direction of about 20 nm to about 100 nm, such as about 50 nm. The second surface 802b is disposed at an angle 812 of about 3 degrees to about 50 degrees, such as about 15 degrees, from the MFS and/or the first surface 802a.

The HAMR write head 900 of FIG. 9A is similar to the HAMR write head 300 of FIG. 3A, the HAMR write head 400 of FIG. 4, the HAMR write head 700 of FIG. 7, and the HAMR write head 800 of FIG. 8, where a stable material 902 is disposed between and in contact with the NFT 284, the second insulating layer 310, and the thermal shunt 304 at the MFS. The stable material 902 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 902 has a concave shape profile, resulting in the NFT 284 having a convex shape profile shape. The stable material 902 has a first surface 902a disposed at the MFS, a second surface 902b disposed in contact with the second insulating layer 310, a third surface 902c (i.e., a leading edge taper of the stable material 902) disposed between the first surface 902a and the first insulating layer 308, a fourth surface 902d disposed in contact with the thermal shunt 304, a fifth surface 902e disposed in contact with the NFT 284, and a sixth surface 902f connecting the fifth surface 902e to the third surface 902c. The sixth surface 902f is aligned with or disposed in a same plane as a surface of the NFT 284. In some embodiments, the fifth surface 902e is linear. While not shown, the HAMR write head 900 may comprise one or more of the optional diffusion barrier layers 330a, 330b, and/or the stable material 902 may be a multilayer structure, like shown in FIGS. 3B and 6B.

The second surface 902b has a length 916 in the y-direction of about 5 nm to about 90 nm, such as about 25 nm, from the MFS to the third surface 902c. A thickness 932 of the stable material 902 from the second surface 902b to the sixth surface 902f in the x-direction is about 60 nm to about 120 nm. A corner of interface 903 between the NFT 284 and the fifth and sixth surfaces 902e, 902f of the stable material 902 is disposed at an angle 912 of about 30 degrees to about 90 degrees, such as about 60 degrees, with respect to an interface between the NFT 284 and the first insulating layer 308.

The HAMR write head 950 of FIG. 9B is similar to the HAMR write head 900 of FIG. 9A, where a stable material 952 is disposed between and in contact with the NFT 284, the second insulating layer 310, and the thermal shunt 304 at the MFS. The stable material 952 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The stable material 952 has a concave shape profile, resulting in the NFT 284 having a convex shape profile shape. The stable material 952 has a first surface 952a disposed at the MFS, a second surface 952b disposed in contact with the second insulating layer 310, a third surface 952c (i.e., a leading edge taper of the stable material 952) disposed between the first surface 952a and the first insulating layer 308, a fourth surface 952d disposed in contact with the thermal shunt 304, and a fifth surface 952e disposed in contact with the NFT 284. The third surface 952c is aligned with or disposed in a same plane as a leading edge taper of the NFT 284. In some embodiments, the fifth surface 952e is linear. While not shown, the HAMR write head 950 may comprise one or more of the optional diffusion barrier layers 330a, 330b, and/or the stable material 952 may be a multilayer structure, like shown in FIGS. 3B and 6B.

The second surface 952b has a length 956 in the y-direction of about 5 nm to about 90 nm, such as about 25 nm, from the MFS to the third surface 952c. A thickness 934 of the stable material 952 from the second surface 952b a point of contact 953 in the x-direction is about 30 nm to about 70 nm. A point of contact 953 or corner of interface between the NFT 284 and the third and fifth surfaces 952c, 952e of the stable material 902 is disposed at an angle 913 of about 80 degrees to about 140 degrees, such as about 110 degrees, with respect to an interface between the NFT 284 and the first insulating layer 308.

Figure 10:
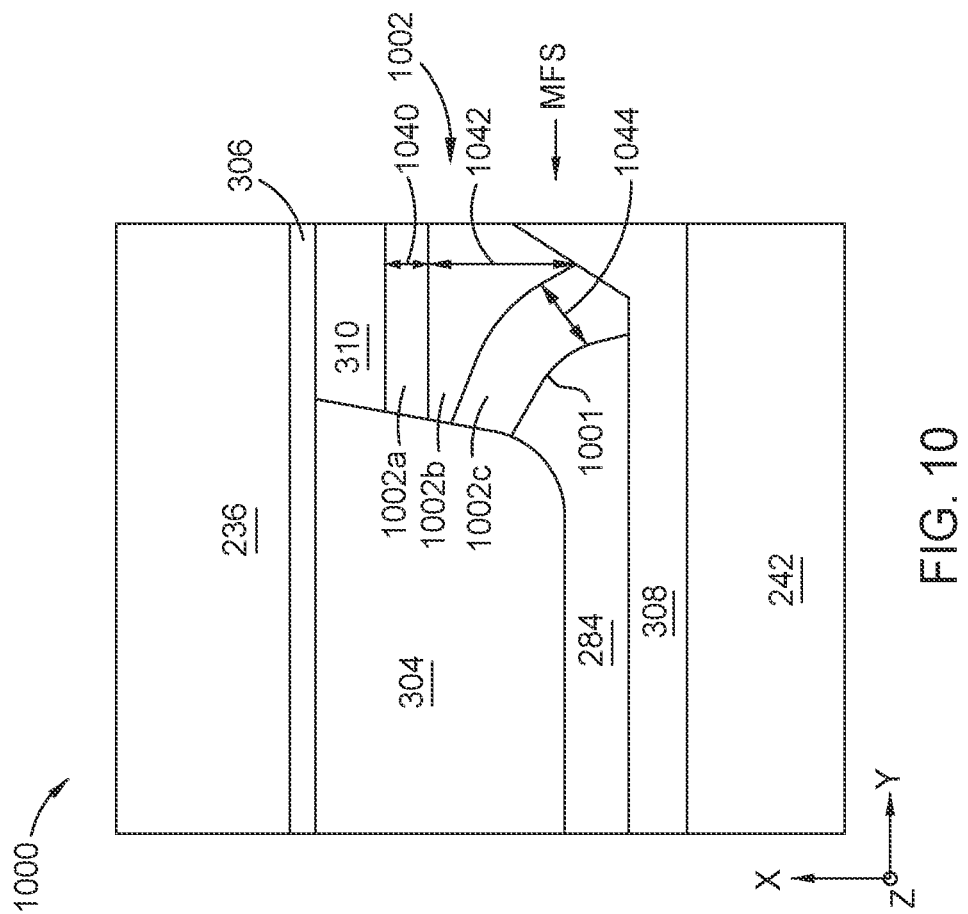
FIG. 10 illustrates a cross-sectional view of a portion of HAMR write head, according to another embodiment.

FIG. 10 illustrate a cross-sectional view of a portion of HAMR write head 1000 comprising multiple stable material layers 1002a, 1002b, 1002c, according to one embodiment.

Similar to the HAMR write heads 350 and 650 of FIGS. 3B and 6B, respectively, the HAMR write head 1000 comprises a stable material structure 1002. The stable material structure 1002 comprises a first stable material layer 1002a disposed at the MFS and in contact with the second insulating layer 310 and the thermal shunt 304. A second stable material layer 1002b is disposed in contact with the first stable material layer 1002a and the thermal shunt 304, and a third stable material layer 1002c is disposed in contact with the second stable material layer 1002b and the NFT 284. Each stable material layer 1002a-1002c individually comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. In some embodiments, two or more stable material layers 1002a, 1002b, 1022c comprise different materials.

The first stable material layer 1002a is substantially perpendicular to the MFS and has a thickness 1040 in the x-direction of about 5 nm to about 30 nm, such as about 15 nm. The second stable material layer 1002b has a wedge-like shape or a triangular shape, and is partially disposed at the MFS. The first insulating layer 308 recesses a portion of the second stable material layer 1002b from the MFS. The second stable material layer 1002b has a thickness 1042 in the x-direction of about 10 nm to about 90 nm, such as about 50 nm. The third stable material layer 1002c is recessed from the MFS by the first insulating layer 308, and may have a curved or arced shape, and has a concave curved surface 1001 disposed in contact with the NFT 284, resulting in the NFT 284 having a convex profile shape. The third stable material layer 1002c has a thickness 1044 in the xy-direction of about 5 nm to about 60 nm, such as about 30 nm. While three stable material layers 1002a-1002c are shown, the stable material structure 1002 may comprise additional or fewer stable material layers.

During write operations, an optical near-field is generated near the top corner of the NFT (e.g., the MFS side of the interface between the NFT and dielectric layer), and the top corner of the NFT is locally heated and sometimes deformed due to heat. By adding the stable material at the top corner of the NFT, deformation of the NFT is prevented, and the lifetime of the NFT is improved. The stable material typically has a higher optical loss than the material used for the main body of NFT and causes an extremely high temperature. The heat is transferred to the main body of NFT, which sometimes causes deformation of the main body of the NFT near the stable material layer. By varying the shape of the stable material layer as described above, heat flow from the main body of the NFT to the thermal shunt is increased and the temperature of the main body of the NFT is thus reduced. Therefore, the lifetime of the NFT is improved. The stable material also reduces the confinement of optical near-field due to higher optical loss and decreases the thermal gradient in the recording layer, which reduces areal recording density. By varying the shape of the stable material layer as described above, the amount of stable material with higher optical loss can be reduced, and the confinement of the optical near-field is improved. Therefore, the thermal gradient in the recording layer can be increased and thus, the areal recording density can be increased.

In one embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT between the thermal shunt and the MFS, the stable material having a wedge shape comprising: a first surface disposed at the MFS, a second surface extending from the MFS to the thermal shunt, and one of: a third surface disposed adjacent to the NFT connecting the first surface to the second surface, or a third surface and a fourth surface, wherein is the third surface is disposed adjacent to the NFT and the fourth surface disposed adjacent to the thermal shunt and connects the third surface to the second surface, and wherein a length of the first surface disposed at the MFS is greater than a length of the fourth surface disposed adjacent to the thermal shunt to create the wedge shape.

The first surface has a length of about 5 nm to about 60 nm. The magnetic recording head further comprises a diffusion barrier layer disposed between the NFT and the stable material. The third surface is disposed at an angle of about 20 degrees to about 87 degrees with respect to the MFS. The stable material is disposed in contact with the thermal shunt. The stable material comprises a first stable material layer and a second stable material layer, the first and second stable material layers comprising different materials. The stable material is spaced from the thermal shunt. A magnetic recording device comprises the magnetic recording head.

In another embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT between the thermal shunt and the MFS, the stable material comprising a first portion and a second portion, wherein the first portion extends from the MFS to the second portion at an angle of about 3 degrees to about 87 degrees with respect to the MFS, and wherein the second portion extends from the first portion to the thermal shunt.

The first portion is substantially triangular in shape and the second portion is substantially square in shape. The stable material is trapezoidal-shaped. The first portion and the second portion have a substantially same thickness. The stable material comprises a first stable material layer and a second stable material layer, the first and second stable material layers comprising different materials. The stable material is disposed in contact with the thermal shunt and the NFT. A magnetic recording device comprises the magnetic recording head.

In another embodiment, a magnetic recording head comprises a main pole, a waveguide disposed adjacent to the main pole, a near field transducer (NFT) coupled between the main pole and the waveguide at a media facing surface (MFS), a thermal shunt disposed on the NFT, the thermal shunt being recessed from the MFS, and a stable material disposed on the NFT at the MFS, the stable material being spaced from the thermal shunt, wherein the stable material comprises a first surface disposed at the MFS, a second surface disposed substantially perpendicular to the MFS, and a third surface connecting the first surface and the second surface, the third surface being curved.

The first surface has a length greater than or equal to a length of the second surface. The third surface is a convex curve. The stable material is spaced from the thermal shunt by a distance of about 10 nm to about 90 nm. The third surface is a concave curve such that the NFT has a convex profile shape. The stable material is disposed in contact with the NFT. The stable material comprises a first stable material layer and a second stable material layer, the first and second stable material layers comprising different materials. The stable material comprises a first stable material layer, a second stable material layer, and a third stable material layer, the third stable material layer comprising the third surface, wherein at least two of the first, second, and third stable material layers comprise different materials. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
a main pole;
a waveguide disposed adjacent to the main pole;
a near field transducer (NFT) coupled between the main pole and the waveguide at a media facing surface (MFS);
a thermal shunt disposed on the NFT, the thermal shunt being recessed from the MFS; and
a stable material disposed on the NFT between the thermal shunt and the MFS, the stable material having a wedge shape comprising:
a first surface disposed at the MFS;
a second surface extending from the MFS to the thermal shunt; and
one of:
a third surface disposed adjacent to the NFT connecting the first surface to the second surface, wherein the third surface is disposed at an angle of about 20 degrees to about 87 degrees with respect to the MFS, or a third surface and a fourth surface,
wherein is the third surface is disposed adjacent to the NFT and the fourth surface disposed adjacent to the thermal shunt and connects the third surface to the second surface, and
wherein a length of the first surface disposed at the MFS is greater than a length of the fourth surface disposed adjacent to the thermal shunt to create the wedge shape.

2. The magnetic recording head of claim 1, further comprising a diffusion barrier layer disposed between the NFT and the stable material.

3. A magnetic recording head, comprising:
a main pole;
a waveguide disposed adjacent to the main pole;
a near field transducer (NFT) coupled between the main pole and the waveguide at a media facing surface (MFS);
a thermal shunt disposed on the NFT, the thermal shunt being recessed from the MFS; and
a stable material disposed on the NFT between the thermal shunt and the MFS, the stable material having a wedge shape comprising:
a first surface disposed at the MFS;
a second surface extending from the MFS to the thermal shunt; and
one of:
a third surface disposed adjacent to the NFT connecting the first surface to the second surface, or
a third surface and a fourth surface,
wherein is the third surface is disposed adjacent to the NFT and the fourth surface disposed adjacent to the thermal shunt and connects the third surface to the second surface,
wherein a length of the first surface disposed at the MFS is greater than a length of the fourth surface disposed adjacent to the thermal shunt to create the wedge shape, and
wherein the first surface has a length of about 5 nm to about 60 nm.

4. The magnetic recording head of claim 1, wherein the stable material is disposed in contact with the thermal shunt.

5. A magnetic recording head, comprising:
a main pole;
a waveguide disposed adjacent to the main pole;
a near field transducer (NFT) coupled between the main pole and the waveguide at a media facing surface (MFS);
a thermal shunt disposed on the NFT, the thermal shunt being recessed from the MFS; and
a stable material disposed on the NFT between the thermal shunt and the MFS, the stable material having a wedge shape comprising:
a first surface disposed at the MFS;
a second surface extending from the MFS to the thermal shunt; and
one of:
a third surface disposed adjacent to the NFT connecting the first surface to the second surface, or
a third surface and a fourth surface,
wherein is the third surface is disposed adjacent to the NFT and the fourth surface disposed adjacent to the thermal shunt and connects the third surface to the second surface,
wherein a length of the first surface disposed at the MFS is greater than a length of the fourth surface disposed adjacent to the thermal shunt to create the wedge shape, and wherein the stable material comprises a first stable material layer and a second stable material layer, the first and second stable material layers comprising different materials.

6. The magnetic recording head of claim 1, wherein the stable material is spaced from the thermal shunt.

7. A magnetic recording device comprising the magnetic recording head of claim 1.

8. A magnetic recording head, comprising:
a main pole;
a waveguide disposed adjacent to the main pole;
a near field transducer (NFT) coupled between the main pole and the waveguide at a media facing surface (MFS);
a thermal shunt disposed on the NFT, the thermal shunt being recessed from the MFS; and
a stable material disposed on the NFT between the thermal shunt and the MFS, the stable material comprising a first portion and a second portion, wherein the first portion extends from the MFS to the second portion at an angle of about 3 degrees to about 87 degrees with respect to the MFS, and wherein the second portion extends from the first portion to the thermal shunt.

9. The magnetic recording head of claim 8, wherein the first portion is substantially triangular in shape and the second portion is substantially square in shape.

10. The magnetic recording head of claim 9, wherein the stable material is trapezoidal-shaped.

11. The magnetic recording head of claim 8, wherein the first portion and the second portion have a substantially same thickness.

12. The magnetic recording head of claim 8, wherein the stable material comprises a first stable material layer and a second stable material layer, the first and second stable material layers comprising different materials.

13. The magnetic recording head of claim 8, wherein the stable material is disposed in contact with the thermal shunt and the NFT.

14. A magnetic recording device comprising the magnetic recording head of claim 8.

15. A magnetic recording head, comprising:
a main pole;
a waveguide disposed adjacent to the main pole;
a near field transducer (NFT) coupled between the main pole and the waveguide at a media facing surface (MFS);
a thermal shunt disposed on the NFT, the thermal shunt being recessed from the MFS; and
a stable material disposed on the NFT at the MFS, the stable material being spaced from the thermal shunt by the NFT, wherein the stable material comprises a first surface disposed at the MFS, a second surface disposed substantially perpendicular to the MFS, and a third surface connecting the first surface and the second surface, the third surface being curved.

16. The magnetic recording head of claim 15, wherein the first surface has a length greater than or equal to a length of the second surface.

17. The magnetic recording head of claim 15, wherein the third surface is a convex curve.

18. The magnetic recording head of claim 15, wherein the stable material is spaced from the thermal shunt by a distance of about 10 nm to about 90 nm.

19. The magnetic recording head of claim 15, wherein the third surface is a concave curve such that the NFT has a convex profile shape.

20. The magnetic recording head of claim 15, wherein the stable material is disposed in contact with the NFT.

21. The magnetic recording head of claim 15, wherein the stable material comprises a first stable material layer and a second stable material layer, the first and second stable material layers comprising different materials.

22. The magnetic recording head of claim 15, wherein the stable material comprises a first stable material layer, a second stable material layer, and a third stable material layer, the third stable material layer comprising the third surface, wherein at least two of the first, second, and third stable material layers comprise different materials.

23. A magnetic recording device comprising the magnetic recording head of claim 15.

* * * * *